US 12,228,676 B2

(12) United States Patent
Shiozaki et al.

(10) Patent No.: US 12,228,676 B2
(45) Date of Patent: Feb. 18, 2025

(54) RADAR APPARATUS

(71) Applicant: Panasonic Intellectual Property Management Co., Ltd., Osaka (JP)

(72) Inventors: Ryosuke Shiozaki, Tokyo (JP); Ken Takahashi, Ishikawa (JP); Noriaki Saito, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 496 days.

(21) Appl. No.: 17/591,488

(22) Filed: Feb. 2, 2022

(65) Prior Publication Data

US 2024/0310477 A1    Sep. 19, 2024

Related U.S. Application Data

(63) Continuation of application No. PCT/JP2020/024669, filed on Jun. 23, 2020.

(30) Foreign Application Priority Data

Aug. 5, 2019   (JP) ................. 2019-143752

(51) Int. Cl.
   *G01S 7/03*      (2006.01)
   *G01S 7/02*      (2006.01)
   (Continued)

(52) U.S. Cl.
   CPC .............. *G01S 7/032* (2013.01); *G01S 7/027* (2021.05); *G01S 13/931* (2013.01); *H01Q 1/3233* (2013.01)

(58) Field of Classification Search
   CPC ........ G01S 7/032; G01S 7/027; G01S 13/931; H01Q 1/3233
   (Continued)

(56) References Cited

U.S. PATENT DOCUMENTS 5,955,752 A     9/1999  Fukaya et al.
10,404,656 B2 * 9/2019  Mochizuki ............. H01Q 23/00
                        (Continued)

FOREIGN PATENT DOCUMENTS

CN    109804264 A  *  5/2019  ........... G01S 13/931
EP    3 200 278 A1    8/2017
                        (Continued)

OTHER PUBLICATIONS

Tirkey et al. "The Quest for Perfect Electromagnetic Absorber: A Review" International Journal of Microwave and Wireless Technologies, Dec. 3, 2018, pp. 151-167 (Year: 2018).*

(Continued)

*Primary Examiner* — Bernarr E Gregory
*Assistant Examiner* — Samarina Makhdoom
(74) *Attorney, Agent, or Firm* — Seed IP Law Group LLP

(57) ABSTRACT

A radar apparatus includes a circuit board including a board surface provided with an antenna module for transmitting an electromagnetic wave, a housing accommodating the circuit board and including a facing wall facing the board surface, and a heat transfer module transferring heat generated inside the housing to the housing. The facing wall includes a transmission portion transmitting therethrough the electromagnetic wave transmitted from the antenna module and an absorption portion having a thickness different from the thickness of the transmission portion and absorbing the electromagnetic wave which is incident. The heat transfer module includes a first transfer member placed to be in contact with the absorption portion in the housing and a second transfer member transferring the heat to the first transfer member.

11 Claims, 8 Drawing Sheets

(51) Int. Cl.
*G01S 13/931* (2020.01)
*H01Q 1/32* (2006.01)

(58) Field of Classification Search
USPC .......................................................... 342/124
See application file for complete search history.

(56) References Cited

U.S. PATENT DOCUMENTS

| | | | |
|---|---|---|---|
| 2004/0036645 | A1 | 2/2004 | Fujieda et al. |
| 2009/0135043 | A1* | 5/2009 | Leblanc ............... H05K 9/0007 |
| | | | 29/840 |
| 2015/0229020 | A1 | 8/2015 | Sugimoto et al. |
| 2016/0174357 | A1* | 6/2016 | Paine ...................... H01R 12/72 |
| | | | 361/709 |
| 2016/0274216 | A1* | 9/2016 | Minami ................. G01S 13/931 |
| 2017/0302621 | A1 | 10/2017 | Kinoshita |
| 2019/0165460 | A1 | 5/2019 | Shiozaki et al. |
| 2019/0212418 | A1* | 7/2019 | Lee ....................... G01S 7/4813 |

FOREIGN PATENT DOCUMENTS

| | | | |
|---|---|---|---|
| JP | 11-004118 | A | 1/1999 |
| JP | 2004-077399 | A | 3/2004 |
| JP | 2005-249659 | A | 9/2005 |
| JP | 2007057483 | A * | 3/2007 |
| JP | 2014-050031 | A | 3/2014 |
| JP | 2016173350 | A | 9/2016 |
| JP | 2017-152810 | A | 8/2017 |
| JP | 6365676 | B2 | 7/2018 |
| JP | 2019-097117 | A | 6/2019 |

OTHER PUBLICATIONS

International Search Report, mailed Aug. 25, 2020, for International Application No. PCT/JP2020/024669 (6 pages including translation).

English Translation of Japanese Office Action, issued Feb. 7, 2023, for Japanese Patent Application No. 2019-143752. (3 pages).

* cited by examiner

RADAR APPARATUS

TECHNICAL FIELD

The present disclosure relates to a radar apparatus.

BACKGROUND ART

A radar apparatus that detects a position of an object in a noncontact manner using a frequency band of a millimeter wave or a microwave is known. This type of radar apparatus has a configuration in which an antenna is hermetically sealed by a housing as described in Patent Literature (hereinafter, referred to as "PTL") 1, for example.

CITATION LIST

Patent Literature

PTL 1
Japanese Patent Application Laid-Open No. H11-4118

SUMMARY OF INVENTION

Technical Problem

However, an electromagnetic wave (in particular, a high frequency wave) transmitted to the outside of the housing may be reflected by the member located in the middle of the transmitting direction, returned to the side of the housing, and re-reflected by the housing, which results in multiple reflections. When multiple reflections occur, the electromagnetic wave transmitted from the antenna and the electromagnetic wave re-reflected may cancel each other out. This may impair the function of the radar apparatus.

Moreover, a circuit board located in the housing and the components mounted on the circuit board are not exposed outside in this type of radar apparatus. This makes it difficult to secure heat dissipation of these components.

An object of the present disclosure is to provide a radar apparatus capable of suppressing occurrences of multiple reflections while securing heat dissipation of the circuit board and other components inside the housing.

Solution to Problem

A radar apparatus according to the present disclosure includes: a circuit board including a board surface provided with an antenna module for transmitting an electromagnetic wave; a housing accommodating the circuit board and including a facing wall facing the board surface; and a heat transfer module transferring heat generated inside the housing to the housing. In the radar apparatus, the facing wall includes: a transmission portion transmitting therethrough the electromagnetic wave transmitted from the antenna module; and an absorption portion having a thickness different from a thickness of the transmission portion and absorbing the electromagnetic wave which is incident. In the radar apparatus, the heat transfer module includes: a first transfer member placed in contact with at least the absorption portion in the housing; and a second transfer member transferring the heat to the first transfer member.

Advantageous Effects of Invention

According to the present disclosure, it is possible to prevent multiple reflections while securing heat dissipation of the circuit board and other components inside the housing.

DESCRIPTION OF EMBODIMENTS

Figure 1:
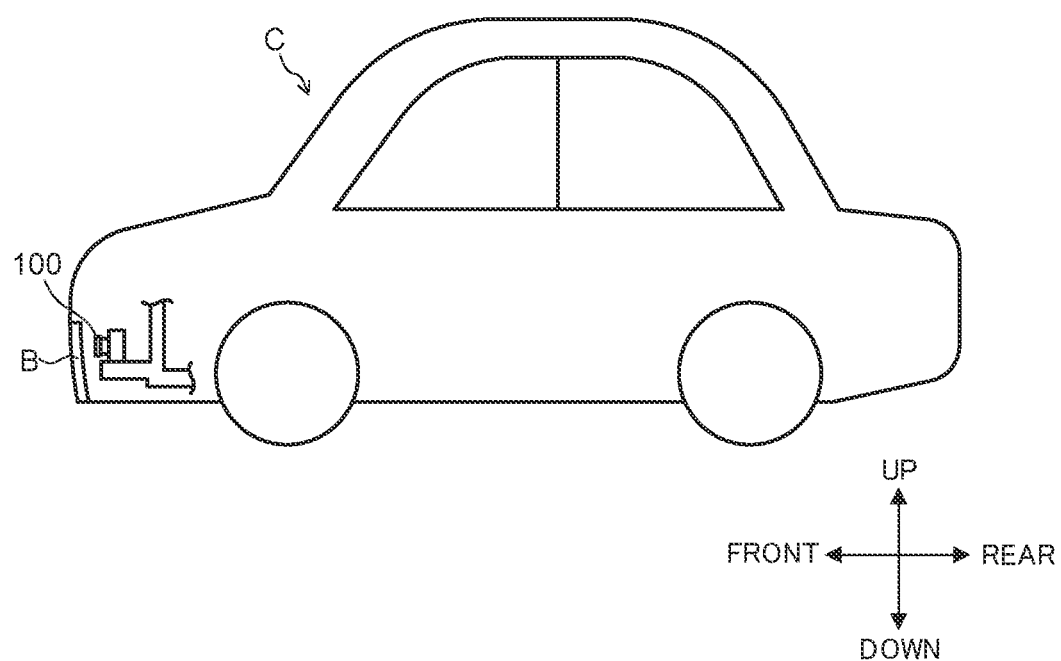
FIG. 1 is a diagram illustrating a vehicle provided with a radar apparatus according to an embodiment of the present disclosure.
Figure 2:
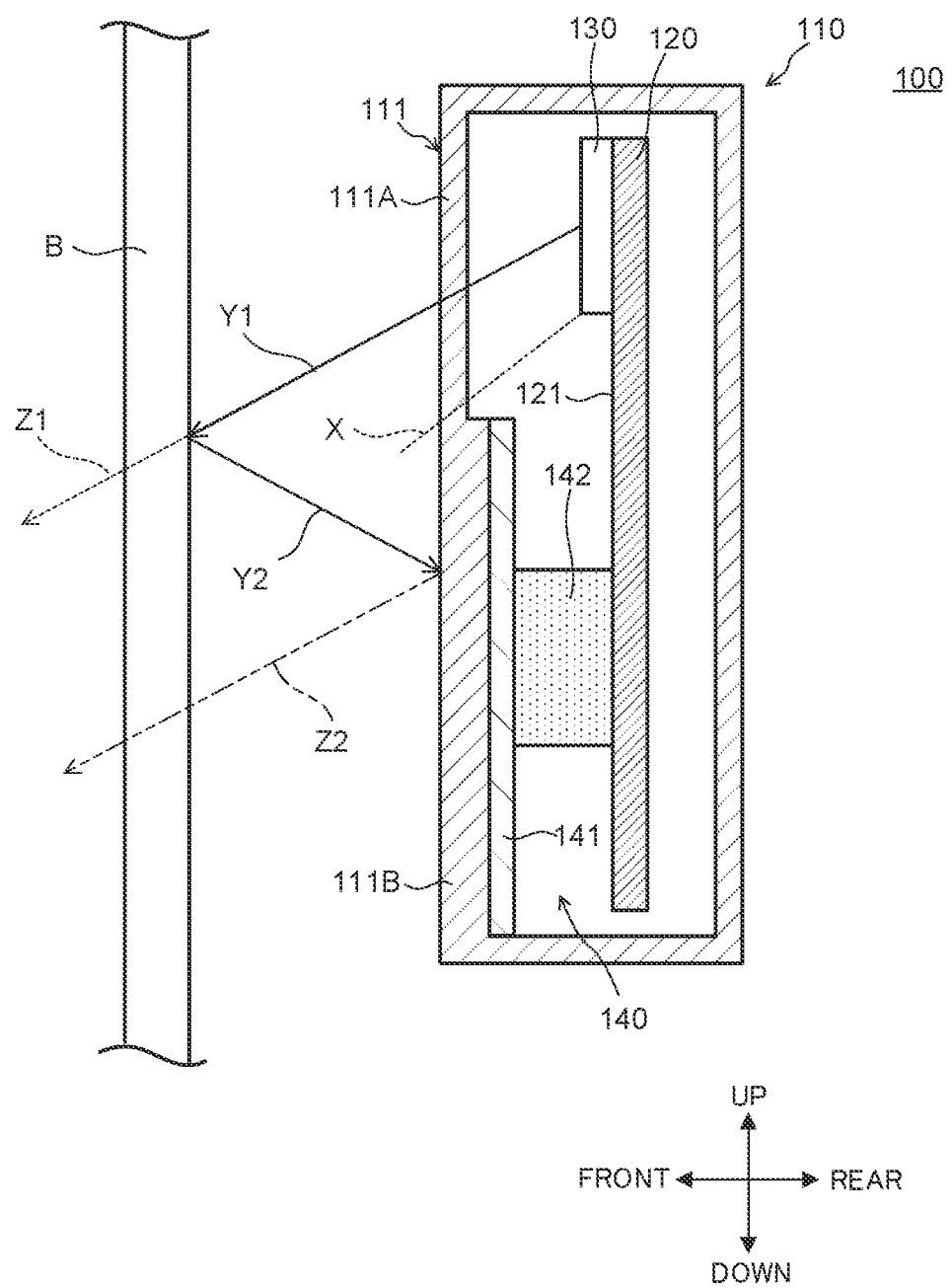
FIG. 2 is a cross-sectional view of the radar apparatus according to the present embodiment.

Hereinafter, an embodiment of the present disclosure will be described in detail with reference to the drawings. FIG. 1 is a diagram illustrating vehicle C provided with radar apparatus 100 according to an embodiment of the present disclosure. FIG. 2 is a cross-sectional view of radar apparatus 100 according to the embodiment.

As shown in FIG. 1, radar apparatus 100 is provided, for example, to cover member B of vehicle C, and transmits and receives electromagnetic waves in a frequency band of a millimeter wave or higher than a millimeter wave.

As shown in FIG. 2, radar apparatus 100 includes housing 110, circuit board 120, antenna 130, and heat transfer part 140. FIG. 2 and other figures are diagrams illustrating radar apparatus 100 as viewed from above. In FIG. 2 and other figures, the left side shows a "front" side, the right side shows a "rear" side, the upper side shows an "upper" side, and the lower side shows a "lower" side. Note that each direction is not limited to the examples of FIG. 2 and other figures, and may be any direction.

Housing 110 is a housing made of a resin and is formed in a rectangular parallelepiped shape having sides extending either in the front and rear, left and right, or up and down direction. Front wall 111 of housing 110 faces cover member B. Further, in housing 110, front wall 111 faces board surface 121, which is the front side board surface of circuit board 120. Front wall 111 has transmission part (transmission portion) 111A and absorption part (absorption portion) 111B. Front wall 111 corresponds to a "facing wall" of the present disclosure.

Transmission part 111A forms an upper portion of front wall 111. Transmission part 111A is a portion of front wall 111 which transmits therethrough electromagnetic waves sent and received by antenna (antenna module) 130, and is configured to have a thickness in the front and rear direction that allows transmission of electromagnetic waves transmitted and received by antenna 130.

Absorption part 111B forms a lower portion of front wall 111. Absorption part 111B combined with first transfer member 141 described later is a portion for absorbing electromagnetic waves entering from the outside of housing 110. The entire thickness of absorption part 111B in the front and rear direction is different from the entire thickness of transmission part 111A in the front and rear direction.

The thickness of absorption part 111B is preferably equal to $\lambda e/4 \times (2n+1)$. The term "n" is any integer greater than or equal to zero. Further, it is preferable that the thickness of the above mentioned transmission part 111A capable of transmitting electromagnetic waves be $\lambda e/2 \times m$. The term "m" is any integer greater than or equal to one, and the term "$\lambda e$" represents an effective wavelength depending on the permittivity of absorbing portion 111B (wavelength in absorption part 111B). Note that transmission part 111A and absorption part 111B may be made of materials different from each other.

Circuit board 120 is accommodated in housing 110, and board surface 121 on the front side thereof is placed so as to be parallel to the up and down direction and to be perpendicular to the front and rear direction.

The material of circuit board 120 is not particularly limited in the present disclosure but may be a Printed Circuit Board (PCB), for example. A multilayer board or a semiconductor board having a built-in signal processing unit may be used as circuit board 120. Circuit board 120 typically has a flat plate shape.

Antenna 130 is placed in the upper area of board surface 121 that is the front side of circuit board 120, and sends and receives electromagnetic waves through transmission part 111A. Antenna 130 includes a transmitting antenna element for sending electromagnetic waves and a receiving antenna element for receiving electromagnetic waves.

The sending antenna element sends electromagnetic waves toward cover member B, which is in front of circuit board 120. The receiving antenna element receives electromagnetic waves from the front side of circuit board 120.

Further, as the antenna elements to form antenna 130, a broadside array antenna, which transmits and receives electromagnetic waves in a direction perpendicular to the arrangement direction of the antenna elements, is adopted.

Heat transfer part (heat transfer module) 140 transfers heat generated inside housing 110, such as the heat of circuit board 120, to housing 110. Heat transfer part 140 includes first transfer member 141 and second transfer member 142.

First transfer member 141 is a metal plate for transferring heat of circuit board 120 to housing 110, and is disposed so as to be in contact with absorption part 111B of front wall 111 in housing 110. Also, first transfer member 141 is configured to cover the entire area of absorption part 111B. Note that contact methods of first transfer member 141 with absorption part 111B include a method by which first transfer member 141 (metal plate) is integrally molded during a resin molding of housing 110 and a method by which a thermal paste is applied between first transfer member 141 and absorption part 111B and interposed therebetween.

Further, first transfer member 141 blocks the electromagnetic wave that has been absorbed by absorption part 111B. This makes it possible to prevent electromagnetic waves coming from outside from entering into housing 110.

First transfer member 141 is placed outside the transmission range of the electromagnetic wave sent in the range of half-power angle of antenna 130. Dashed line X in FIG. 2 shows the lowest end of the above mentioned transmission range of antenna 130. First transfer member 141 is placed lower than dashed line X.

This makes it possible to prevents the electromagnetic wave sent from antenna 130 from being reflected to the inside of housing 110 by first transfer member 141.

Second transfer member 142 is a heat radiating agent having elasticity, such as a thermal paste, and transfers heat of circuit board 120 to first transfer member 141. Second transfer member 142 is placed between circuit board 120 and first transfer member 141.

In addition to antenna 130, a heat generating component such as a semiconductor element for signal processing is mounted on or above circuit board 120. Therefore, the configuration in which circuit board 120 is disposed in a hermetically sealed space such as housing 110 has a problem of heat dissipation of circuit board 120.

According to this embodiment, second transfer member 142 allows transfer of the heat of circuit board 120 to first transfer member 141. The heat that has transferred to first transfer member 141 spreads to the entire first transfer member 141, transfers to the entire absorption part 111B, and then is released outside from the portion of absorption part 111B.

This can enhance the heat dissipation of radar apparatus 100.

Further, electromagnetic wave Y1 transmitted from antenna 130 is sent out to the outside of housing 110 through transmission part 111A (see arrow Z1). However, electromagnetic wave Y1 sent out to the outside of housing 110 may be reflected by cover member B (see arrow Y2), returned toward housing 110, and re-reflected by housing 110, which results in multiple reflections (see arrow Z2). When multiple reflections occur, the electromagnetic wave transmitted from antenna 130 and the electromagnetic wave re-reflected may cancel each other out. This may impair the function of radar apparatus 100.

However, in this embodiment, front wall 111 of housing 110 has absorption part 111B absorbing electromagnetic waves when the electromagnetic wave transmitted through transmission part 111A is reflected by cover member B and returned toward housing 110.

This can suppress occurrences of multiple reflections and allows radar apparatus 100 to function properly.

Next, the basis for a preferable thickness of the above described absorption part 111B will be described. The thickness of absorption part 111B is preferably the thickness such that reflected waves reflected by cover member B are not re-radiated toward cover member B as much as possible (e.g., $\lambda e/4 \times (2n+1)$ described above).

Figure 3A:
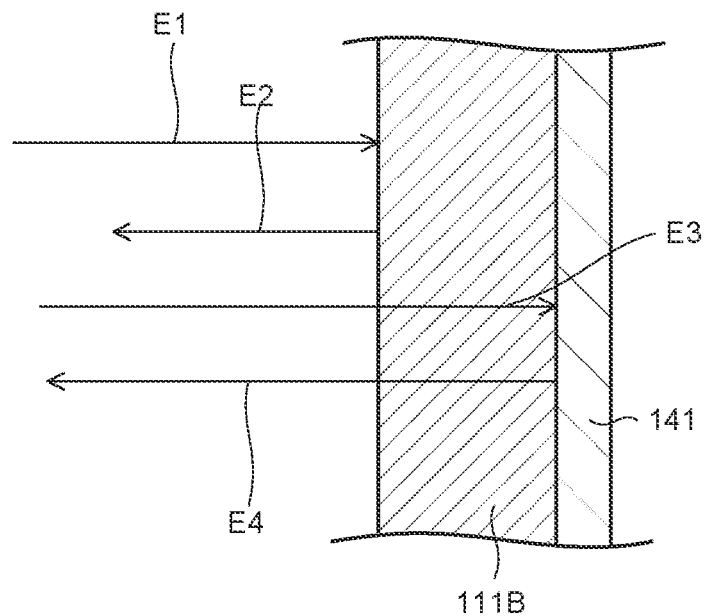
FIG. 3A is a diagram for describing the basis for the thickness of an absorption part.

As shown in FIG. 3A, when electromagnetic wave E1 toward absorption part 111B is set equal to $\sin(-\omega t+kx)$, the electromagnetic wave reflected by absorption part 111B (first electromagnetic wave) E2 is represented as $\sin(-\omega t-kx+\pi)$. The term "$\omega$" represents each frequency of the electromagnetic wave, "t" represents time, "x" represents the phase of the electromagnetic wave, and "k" is $2\pi/\lambda$.

Figure 3B:
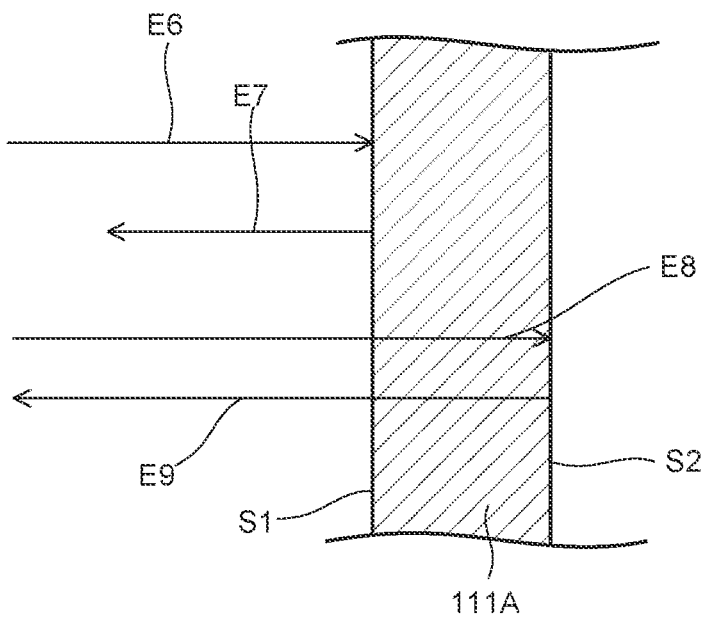
FIG. 3B is a diagram for describing the basis for the thickness of a transmission part.

Note that, in FIGS. 3A and 3B, the arrows of electromagnetic waves entering and reflecting are at shifted positions, respectively, for convenience.

Further, electromagnetic wave (incident wave) E3 entering absorption part 111B is represented as $\sin(-\omega t+kx)$ as well as E1.

Incident wave E3 is reflected by first transfer member 141, and the reflected wave (second electromagnetic wave) E4 is represented as $-\sin(-\omega t-kx+2kd)$. However, the reflection at first transfer member 141 is assumed to be total reflection. The term "d" represents the thickness of absorption part 111B.

In this case, since the above-described first electromagnetic wave E2 is an electromagnetic wave reflected by absorption part 111B and second electromagnetic wave E4 is an electromagnetic wave radiated from absorption part 111B, the two electromagnetic waves E2 and E4 are radiated from the surface of absorption part 111B. Thus, when the combined wave of first electromagnetic wave E2 and second electromagnetic wave E4 is zero, any electromagnetic wave is not radiated from absorption part 111B. That is, it is possible to completely absorb electromagnetic waves by absorption part 111B (see Equation 1 below).

$$\sin(-\omega t - kx + \pi) - \sin(-\omega t - kx + 2kd) = 0 \quad \text{(Equation 1)}$$

According to above Equation 1, $\pi=2kd$, and $d=\lambda/4$ when considering $k=2\pi/\lambda$. Considering the repetition of electromagnetic waves, $d=(n/2+1/4)\lambda=\lambda/4\times(2n+1)$ when the term "n" is an integer greater than or equal to zero.

Having this thickness can achieve absorbing electromagnetic waves effectively without re-radiating electromagnetic waves. In addition, first transfer member 141 can prevent electromagnetic waves from entering the inside of housing 110 through absorption part 111B.

The thickness of absorption part 111B represented by "d" can be varied depending on the value of "n," but is determined by the incident angle of the electromagnetic wave onto absorbing portion 111B. Since the moving distance (phase) of the electromagnetic wave in absorption part 111B changes depending on the incident angle, the thickness of absorption part 111B can be optimally adjusted by choosing an optimum "n" depending on the incident angle of the electromagnetic wave entering absorption part 111B. Note that the value of "n" may be determined in consideration of other factors in addition to the incident angle of the electromagnetic wave.

Next, the basis for the thickness of transmission part 111A will be described. The thickness of transmission part 111A is preferably the thickness that allows transmission of electromagnetic waves sent and received by antenna 130, therethrough as much as possible (e.g., $\lambda e/2\times m$ described above). Note that, unlike absorption part 111B, transmission part 111A does not have a separate member such as first transfer member 141, and thus the reflectance is ignored and only the change in phase is compared in the following description.

As shown in FIG. 3B, when electromagnetic wave E6 toward transmission part 111A is set equal to $\sin(-\omega t+kx)$, reflected wave (third electromagnetic wave) E7 reflected at incident surface S1 of transmission part 111A is represented as $(-\omega t-kx+\pi)=-\sin(-\omega t-kx)$. Further, as well as E1, electromagnetic wave E8 entering transmission part 111A is represented as $\sin(-\omega t+kx)$. Moreover, electromagnetic wave E9, which enters transmission part 111A and is reflected by surface S2, is represented as $\sin(-\omega t-kx+2kd)$.

Third electromagnetic wave E7 that is reflected without entering and fourth electromagnetic wave E9 that has entered and then been returned are radiated from the surface of transmission part 111A. When the combined wave of the two electromagnetic waves is zero, any electromagnetic wave is not reflected by transmission part 111A. Thus, transmission part 111A can completely transmit therethrough electromagnetic waves (see Equation 2 below).

$$-\sin(-\omega t - kx) + \sin(-\omega t - kx + 2kd) = 0 \quad \text{(Equation 2)}$$

According to above Equation 2, since $-\sin(-\omega t-kx)=-\sin(-\omega t-kx+2m\pi)$, $2m\pi=2kd$.

Considering that $k=2\pi/\lambda$, the thickness of transmission part 111A represented by "d" is $2m\pi=4\pi d/\lambda$, and $d=\lambda/2\times m$.

With this thickness, transmission part 111A can transmit therethrough electromagnetic waves without reflecting electromagnetic waves.

Note that, as well as absorption part 111B, the thickness of transmission part 111A can also be adjusted to an optimum thickness by choosing an optimum "m."

According to the embodiment configured as described above, it is possible to suppress occurrence of multiple reflections while securing heat dissipation of circuit board 120 and other components inside housing 110.

Further, placing first transfer member 141 so as to be in contact with absorption part 111B can prevent electromagnetic waves incident on absorption part 111B from entering into housing 110.

Moreover, since second transfer member 142 is placed on circuit board 120, placing second transfer member 142 over circuit board 120 can have a contact area between circuit board 120 and second transfer member 142 to a certain extent. Thus, the heat of circuit board 120 can be transferred to first transfer member 141 efficiently.

Further, since first transfer member 141 is placed over the entirety of absorption part 111B, the heat that has transferred from second transfer member 142 spreads to the entirety of absorption part 141, and thus the heat can be transferred to the entirety of absorption part 111B, which results in efficient dissipation of the heat.

Figure 4:
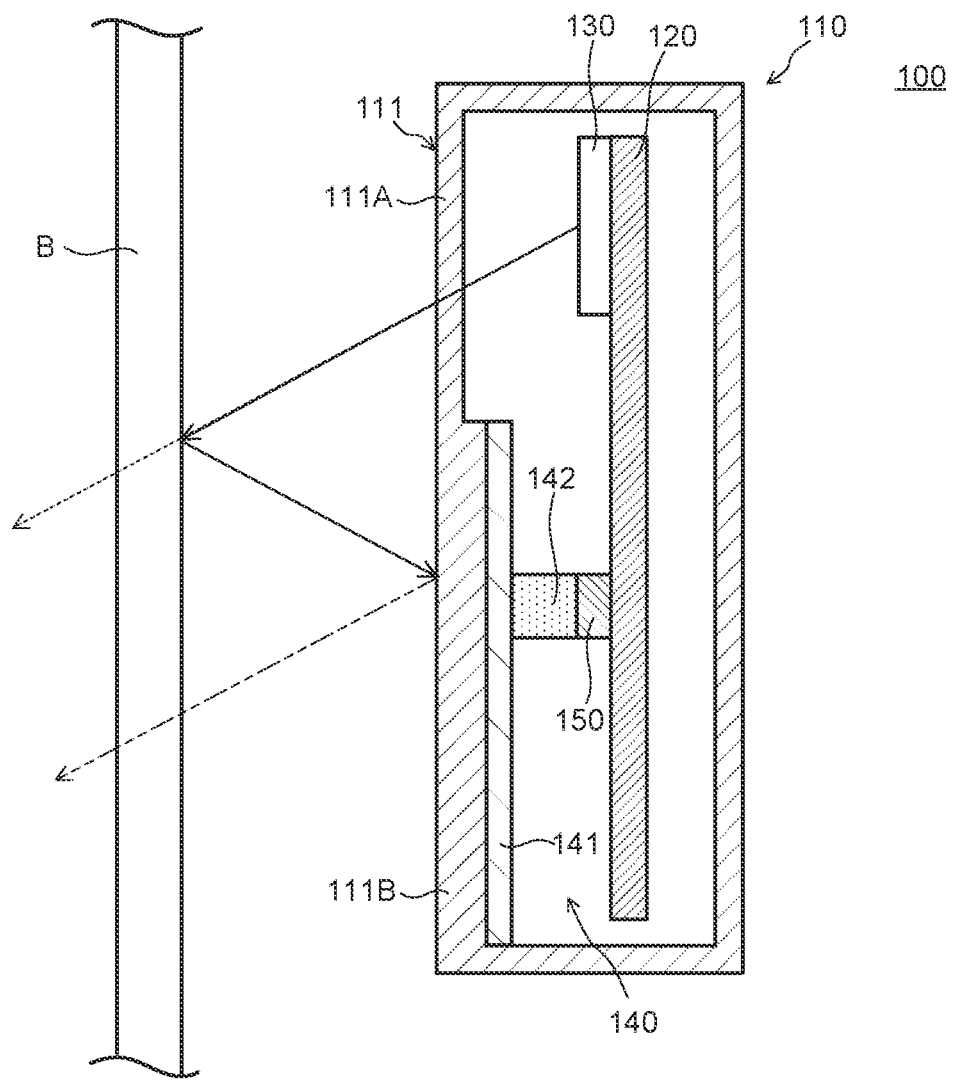
FIG. 4 is a cross-sectional view of the radar apparatus according to a variation.

In the above embodiment, second transfer member 142 is provided so as to be in contact with circuit board 120 and first transfer member 141, but the present disclosure is not limited thereto. For example, as shown in FIG. 4, second transfer member 142 may be provided so as to be in contact with heat generating component 150 mounted on circuit board 120 and first transfer member 141.

This allows the heat of heat generating component 150 to transfer directly to second transfer member 140, which can increase heat dissipation efficiency.

Figure 5:
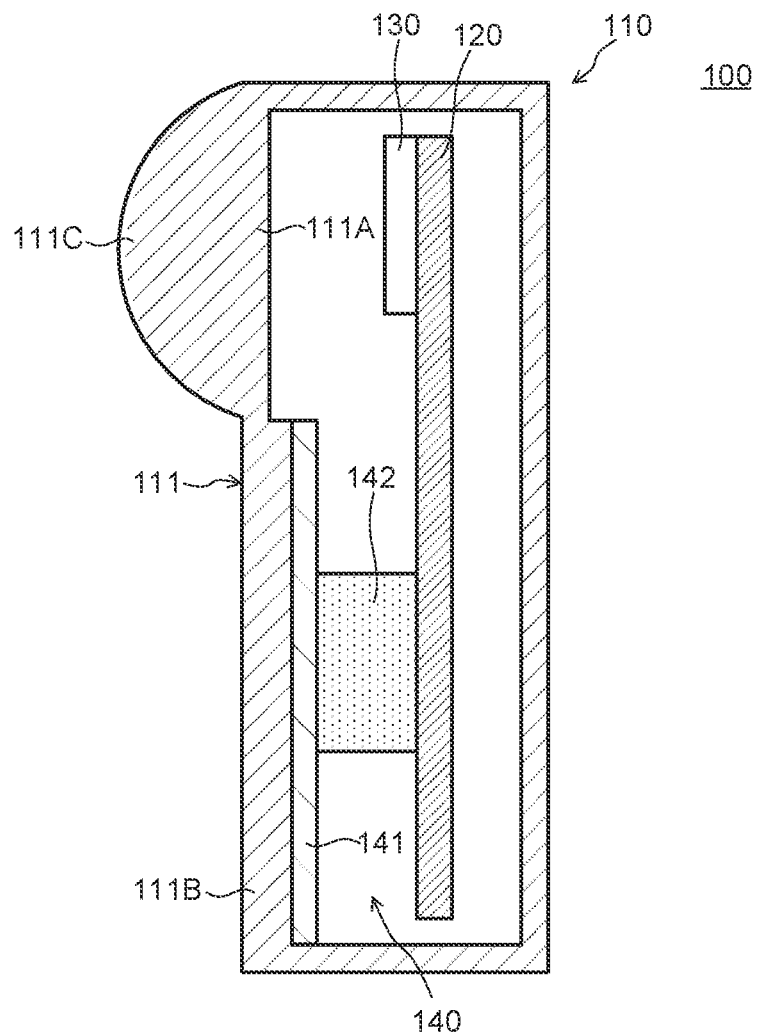
FIG. 5 is a cross-sectional view of the radar apparatus according to the variation having a transmission part that includes a lens portion.
Figure 5:
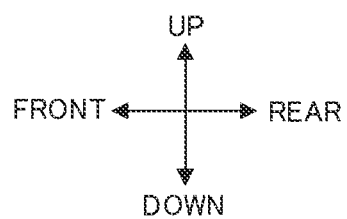

Further, as shown in FIG. 5, a configuration having lens portion 111C in the portion of transmission part 111A is also possible. Lens portion 111C has a semicircular cross-sectional shape. In this configuration, absorption part 111B has a portion having a thickness identical to a thickness of a portion of transmission part 111A, but at least, the thickness of absorption part 111B is different from the thickness of the thickest portion of transmission part 111A.

Such a configuration can also prevent multiple reflections while securing heat dissipation of circuit board 120 and other components. Further, transmission and reception of electromagnetic waves using lens portion 111C is possible.

Figure 6:
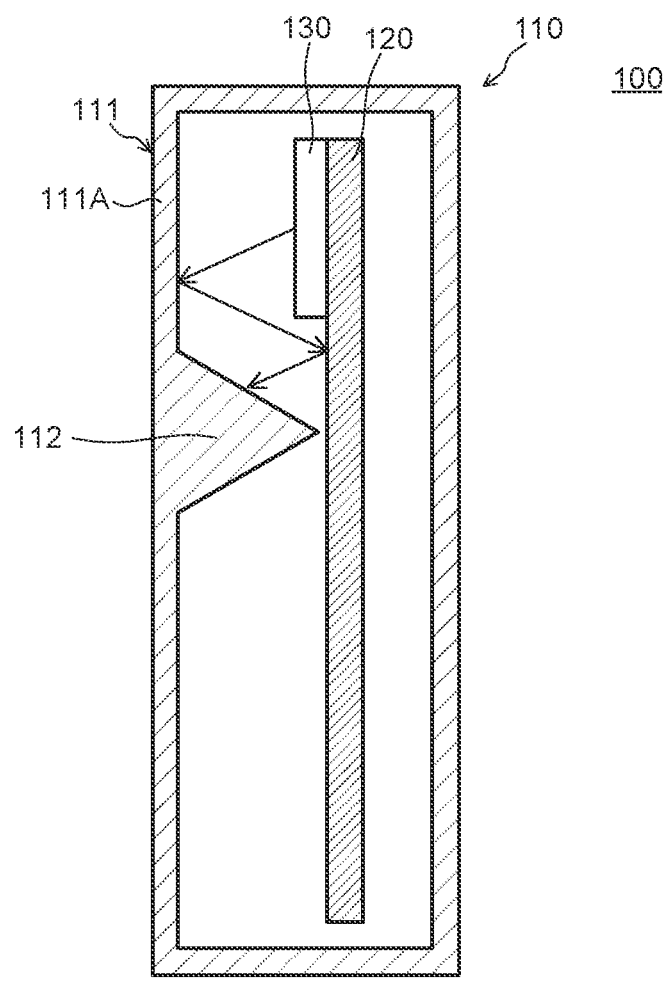
FIG. 6 is a cross-sectional view of the radar apparatus having a shielding portion.
Figure 6:
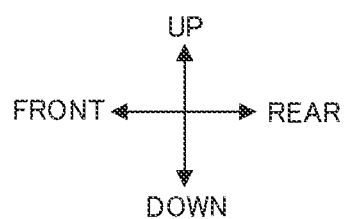

The multiple reflections mentioned above may also occur in housing 110. Examples of configurations for suppressing occurrence of multiple reflections generated inside housing 110 include, for example, as shown in FIG. 6, a configuration in which shielding portion 112 is provided at the border between transmission part 111A of front wall 111 and the portion of front wall 111 other than transmission part 111A.

Shielding portion 112 protrudes from front wall 111 toward circuit board 120. Shielding portion 112 is configured to be narrower as it extends toward circuit board 120. The position of the tip of shielding portion 112 is a position to the extent that does not make the tip in contact with circuit board 120. The shape of shielding portion 112 may be any shape, such as a quadrangular shape.

In this configuration, the electromagnetic wave radiated by antenna 130 and reflected by transmission part 111A is blocked by shield portion 112 when the electromagnetic wave is about to be multiply reflected. Consequently, transmission of electromagnetic waves to the portion other than transmission part 111A can be reduced.

Further, in the above embodiment, transmission part 111A is located at the upper portion of front wall 111, but the present disclosure is not limited thereto. Transmission part 111A may be located at other portions such as the center, lower, left end or right end portion of front wall 111. Absorption part 111B is a portion where transmission part 111A does not exist in front wall 111. That is, when transmission part 111A is located on the lower side of front wall 111, absorption part 111B is located on the upper side of front wall 111, and when transmission part 111A is located in the left end of front wall 111, absorption part 111B is located in the right end of front wall 111.

In addition, in the above embodiment, second transfer member 142 is made of an elastic body, but the present disclosure is not limited thereto, and second transfer member 142 may not be an elastic body. However, it is preferable that second transmission member 142 be made of an elastic body in terms of having a contact with a circuit board or a heat generating component.

Further, first transmission member 141 is provided to absorption part 111B of front wall 111 in the above embodiment, but the present disclosure is not limited thereto. First transmission member 141 may be extended from the absorption part toward the bottom and/or side wall of housing 110, or toward the bottom, side and rear wall of housing 110. In this configuration, the second transfer member may be in contact with the portion of the first transfer member where the first transfer member is not in contact with absorption part 111B.

In the above embodiment, the portion (absorption part) of front wall 111 other than transmission part 111A is configured to be flat, but the present disclosure is not limited thereto. For example, as shown in FIG. 7, the absorption part may include an inclined portion inclined with respect to transmission part 111A.

Figure 7:
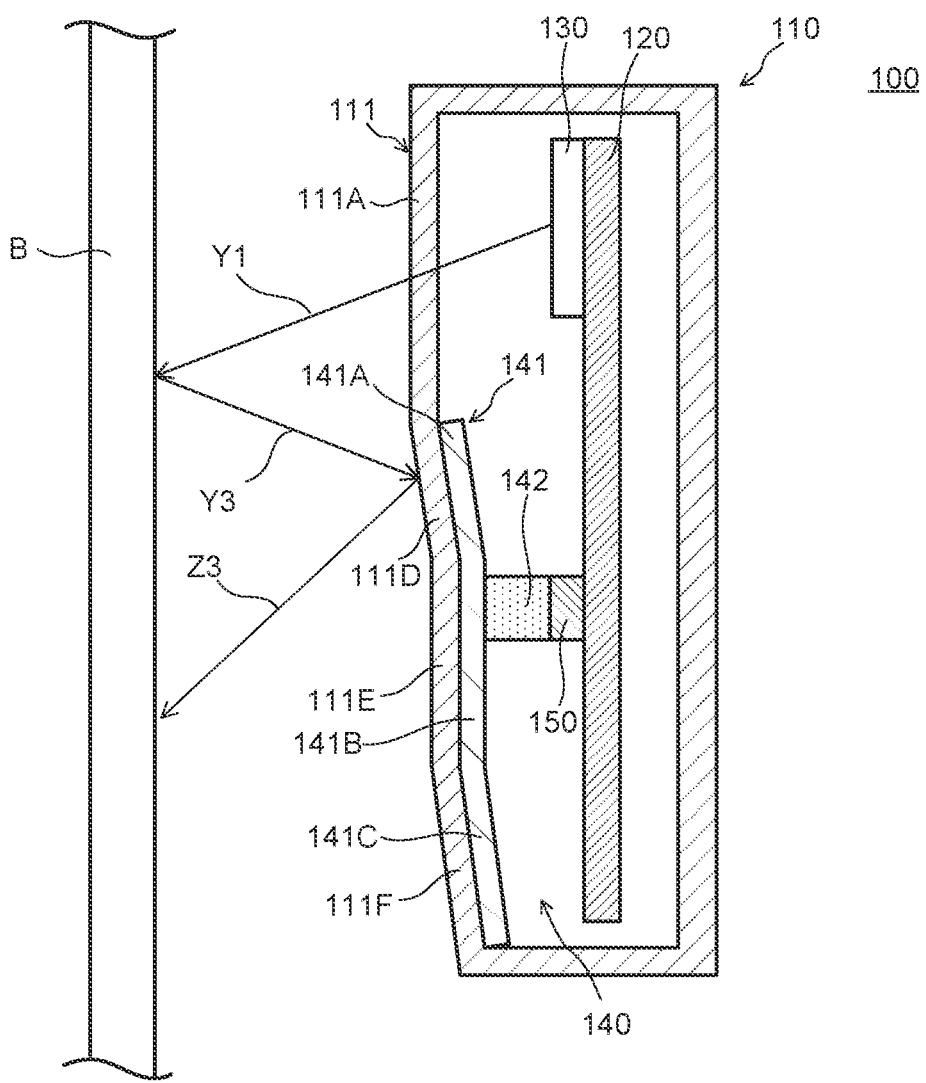
FIG. 7 is a cross-sectional view of the radar apparatus including an inclined portion.
Figure 7:
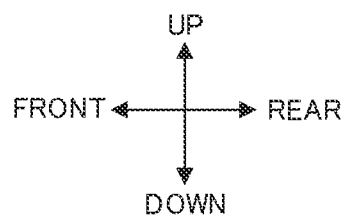

Front wall 111 of housing 110 in radar apparatus 100 shown in FIG. 7 includes transmission part 111A, first portion 111D, second portion 111E, and third portion 111F.

First portion 111D is located below transmission part 111A and extends obliquely rear downward from the lowest end of transmission part 111A. That is, first portion 111D is inclined with respect to transmission part 111A.

Second portion 111E is located below first portion 111D and extends downward from the lowest end of first portion 111D.

Third portion 111F is located below second portion 111E and extends obliquely rear downward from the lower end portion of second portion 111E. That is, third portion 111F is inclined with respect to transmission part 111A.

First transfer member 141 is provided on the back side of first portion 111D, second portion 111B and third portion 111F.

First transmission member 141 is formed along first portion 111D, second portion 111E and third portion 111F, and includes first transfer portion 141A, second transfer portion 141B and third transfer portion 141C.

First transfer portion 141A is placed at the position corresponding to first portion 111D and is in contact with first portion 111D.

Second transfer portion 141B is placed at the position corresponding to second portion 111E and is in contact with second portion 111E.

Third transfer portion 141C is placed at the position corresponding to third portion 111F and is in contact with third portion 111F.

With this configuration, when the electromagnetic wave reaches either first portion 111D or third portion 111F inclined with respect to the up and down direction, the reflected wave (arrow Y3) from cover member B is reflected at an angle different from the angle of electromagnetic wave Y1 transmitted from antennas 130 (see arrow Z3).

That is, in this configuration, when multiple reflections occur, electromagnetic waves by multiple reflections travel at the angle different from the angle of the electromagnetic wave transmitted from antenna 130. This reduces the possibility of the electromagnetic waves cancelling each other out.

Further, in the above embodiment, first transfer member 141 is placed on the lower side of front wall 111, that is, the position corresponding to the position lower than antenna 130, but the present disclosure is not limited thereto. First transfer member 141 may be provided at any position other than the position lower than antenna 130.

Figure 8:
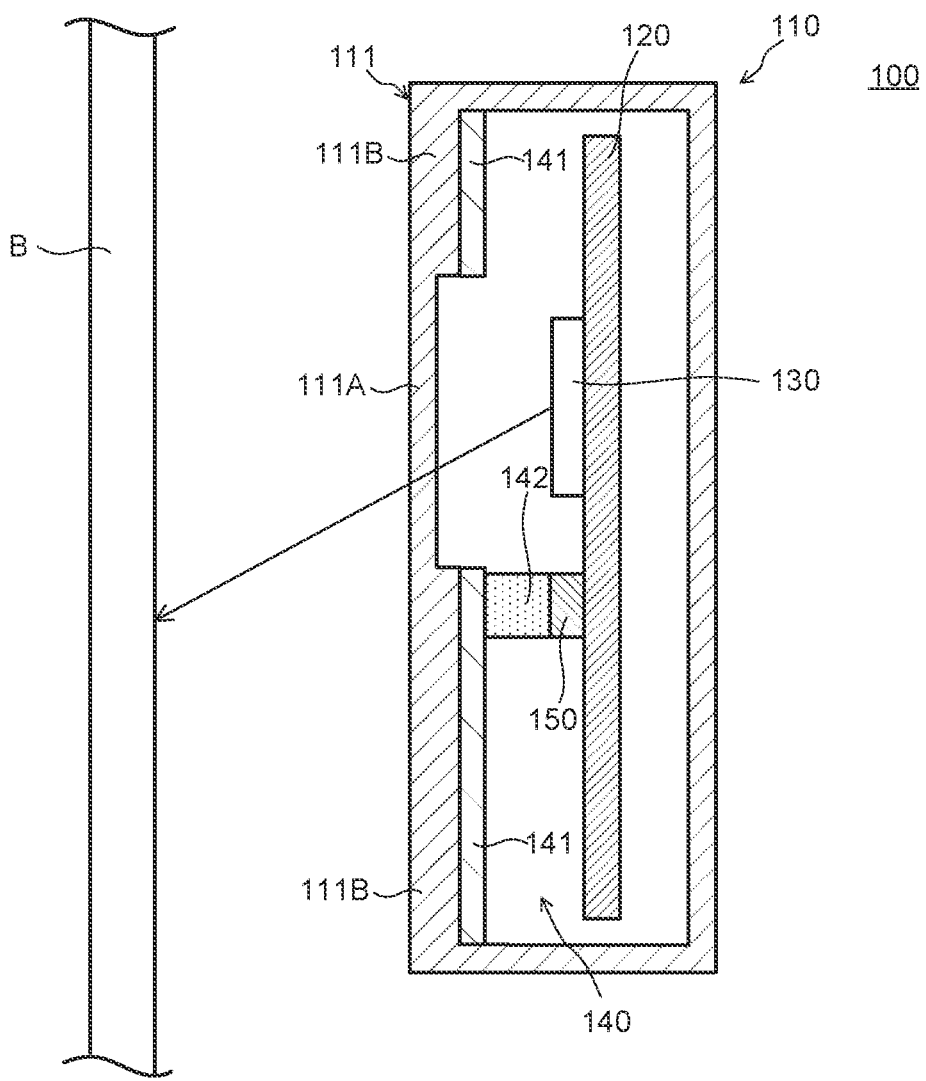
FIG. 8 is a cross-sectional view of the radar apparatus having a configuration in which a transmission part is placed between absorption parts.

For example, as shown in FIG. 8, first transfer member 141 may be provided on both the upper and lower sides than antenna 130 in the up and down direction. Antenna 130 is provided near the central portion of circuit board 120, which is a low position compared with the position in the configuration shown in FIG. 4.

Transmission part 111A is provided at a position near the central portion of front wall 111, which is a position corresponding to antenna 130 in front wall 111. The portion of front wall 111 other than transmission part 111A is absorption part 111B.

Absorption part 111B shown in FIG. 8 is provided in two places, on the upper side and the lower side than transmission part 111A in front wall 111. That is, absorption part 111B is located around transmission part 111A so that transmission part 111A is interposed between absorption parts 111B.

First transmission member 141 is provided on the back sides of both the upper and lower portions of absorption parts 111B. Note that second transmission member 142 and other portions corresponding to first transmission member 141 on the upper side are not shown in the drawing.

Such a configuration can increase the degree of flexibility in layout design of the components in circuit board 120.

In addition, the embodiment described above merely describes an example of implementations for practicing the present disclosure, and should not be construed as limiting the technical scope of the present disclosure. That is, the present disclosure can be implemented in various forms without departing from the spirit or principal features of the present disclosure.

Additionally, the term used for each component element, such as "part" or "portion" or the term ending with a suffix, such as "-er" "-or" or "-ar" in the above-described embodiment may be replaced with another term, such as "circuit (circuitry)," "device," "unit," or "module."

The disclosure of Japanese Patent Application No. 2019-143752, filed on Aug. 5, 2019 including the specification, drawings and abstract is incorporated herein by reference in its entirety.

INDUSTRIAL APPLICABILITY

The radar apparatus in the present disclosure is useful as radar apparatuses each capable of suppressing occurrence of multiple reflections while securing heat dissipation of a circuit board and other components inside a housing.

REFERENCE SIGNS LIST

100 Rader device
110 Housing
111 Front wall
111A Transmission part
111B Absorption part
120 Circuit board
130 Antenna
140 Heat transfer part
140 First transfer member
142 Second transfer member

The invention claimed is:

1. A radar apparatus, comprising:
a circuit board including a board surface provided with an antenna module for transmitting an electromagnetic wave;
a housing accommodating the circuit board and including a facing wall facing the board surface; and
a heat transfer module transferring heat generated inside the housing to the housing, wherein
the facing wall includes:
a transmission portion transmitting therethrough the electromagnetic wave transmitted from the antenna module, the transmission portion having a first thickness corresponding to a wavelength of the electromagnetic wave transmitted from the antenna module; and
an absorption portion having a second thickness different from the first a thickness of the transmission portion, the second thickness corresponding to an effective wavelength of the electromagnetic wave, and the absorption portion is configured to reabsorb a re-incident electromagnetic wave reflected from an object outside the housing which is re-incident on the housing, the absorption portion being made of a same material as the transmitting portion, and wherein
the absorption portion absorbs the electromagnetic wave by reverse-phase synthesis of:
a first electromagnetic wave resulting from reflection of the re-incident electromagnetic wave at a first surface of the absorption portion, and
a second electromagnetic wave resulting from reflection of the re-incident electromagnetic wave at a second surface different from the first surface.

2. The radar apparatus according to claim 1, wherein the transmission portion includes a lens transmitting the electromagnetic wave to an outside of the housing.

3. The radar apparatus according to claim 1, wherein the second thickness is $\lambda e/4 \times (2n+1)$, in case where $\lambda e$ represents the effective wavelength of the electromagnetic wave in the absorption portion and n is an integer greater than or equal to zero.

4. The radar apparatus according to claim 3, wherein the second thickness determined by at least an incident angle of the electromagnetic wave onto the absorption portion.

5. The radar apparatus according to claim 1, wherein the absorption portion includes an inclined portion inclined with respect to the transmission portion.

6. The radar apparatus according to claim 1, wherein the absorption portion is placed around the transmission portion in the facing wall.

7. The radar apparatus according to claim 1, wherein the heat transfer module includes:
a first transfer member placed in contact with at least the absorption portion in the housing; and
a second transfer member transferring the heat to the first transfer member.

8. The radar apparatus according to claim 7, wherein the second transfer member is placed between the first transfer member and the circuit board.

9. The radar apparatus according to claim 7, wherein the second transfer member is placed between the first transfer member and a heat generating component provided to the circuit board.

10. The radar apparatus according to claim 7, wherein the first transfer member is placed on an outer side of a transmission range of an electromagnetic wave transmitted in a range of a half-power angle of the antenna module.

11. The radar apparatus according to claim 1, wherein the first surface is a front surface of the facing wall and the second surface is a back surface of the facing wall, and the second surface is closer to the circuit board than the first surface.

* * * * *